(12) United States Patent
Lorrain et al.

(10) Patent No.: US 10,104,437 B2
(45) Date of Patent: Oct. 16, 2018

(54) METHODS, SYSTEMS, AND MEDIA FOR PROVIDING MEDIA GUIDANCE

(71) Applicant: Google Inc., Mountain View, CA (US)

(72) Inventors: Matthieu Lorrain, New York, NY (US); Tina Yin-Ann Wang, San Francisco, CA (US); Mark Abell, New York, NY (US); Peter Karacas, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/611,429

(22) Filed: Feb. 2, 2015

(65) Prior Publication Data

US 2016/0066054 A1 Mar. 3, 2016

Related U.S. Application Data

(60) Provisional application No. 62/043,697, filed on Aug. 29, 2014.

(51) Int. Cl.
*H04N 5/445* (2011.01)
*H04N 21/482* (2011.01)
*H04N 21/2187* (2011.01)
*H04N 21/218* (2011.01)
*H04N 21/4367* (2011.01)
*H04N 21/81* (2011.01)
(Continued)

(52) U.S. Cl.
CPC ....... *H04N 21/482* (2013.01); *G06F 21/6218* (2013.01); *G06F 21/84* (2013.01); *H04N 21/2187* (2013.01); *H04N 21/21805* (2013.01); *H04N 21/4367* (2013.01); *H04N 21/8113* (2013.01)

(58) Field of Classification Search
CPC .......................... H04N 21/2187; H04N 21/482
USPC .................................. 725/92, 34, 41, 61, 105
See application file for complete search history.

(56) References Cited

U.S. PATENT DOCUMENTS

2003/0058866 A1* 3/2003 Kitayama ........... H04L 12/1881
370/394
2009/0156181 A1* 6/2009 Athsani ................... H04L 12/58
455/414.2

(Continued)

*Primary Examiner* — Jivka Rabovianski
(74) *Attorney, Agent, or Firm* — Byrne Poh LLP

(57) ABSTRACT

Methods, systems, and media for providing media guidance are provided. In some embodiments, the method comprises: causing live media content associated with a first content feed of an event to be presented on a media playback device; causing a verification code to be presented on the media playback device; detecting that the verification code has been provided on a page using a web browsing application executing on a mobile device; in response to the detection, causing additional content relating to the media content that is presented on the media playback device to be presented on the mobile device and causing a user interface element to be presented on the mobile device that, when selected, causes live media content associated with a second content feed of the event to be presented on the media playback device; and in response to determining that the user interface element has been selected, causing the presentation of the live media content associated with the first content feed of the event to no longer be presented and causing the live media content associated with the second content feed of the event to be presented.

27 Claims, 12 Drawing Sheets

(51) Int. Cl.
    *G06F 21/62*     (2013.01)
    *G06F 21/84*     (2013.01)

(56) References Cited

U.S. PATENT DOCUMENTS

| | | | |
|---|---|---|---|
| 2010/0026809 A1* | 2/2010 | Curry | H04N 5/222 |
| | | | 348/157 |
| 2012/0209931 A1* | 8/2012 | Antell | H04H 60/33 |
| | | | 709/206 |
| 2014/0313341 A1* | 10/2014 | Stribling | H04L 67/02 |
| | | | 348/157 |
| 2015/0237389 A1* | 8/2015 | Grouf | H04N 21/26283 |
| | | | 725/49 |
| 2015/0281767 A1* | 10/2015 | Adimatyam | H04N 21/43615 |
| | | | 725/25 |

* cited by examiner

METHODS, SYSTEMS, AND MEDIA FOR PROVIDING MEDIA GUIDANCE

CROSS-REFERENCE TO RELATED APPLICATION

This application claims the benefit of U.S. Provisional Patent Application No. 62/043,697, filed Aug. 29, 2014, which is hereby incorporated by reference herein in its entirety.

TECHNICAL FIELD

The disclosed subject matter relates to methods, systems, and media for providing media guidance.

BACKGROUND

Users often interact with mobile devices, such as a mobile phone or tablet computer, while viewing media content on a media playback device, such as a television or desktop computer. For example, users may check e-mail, view web pages, etc. on their mobile device while the media content is being presented on the media playback device. However, a provider of the media content may want to maintain the user's attention on the media content being presented.

Accordingly, it is desirable to provide new methods, systems, and media for providing media guidance.

SUMMARY

Methods, systems, and media for providing media guidance are provided. In accordance with some embodiments of the disclosed subject matter, methods for providing media guidance are provided, the methods comprising: causing live media content associated with a first content feed of an event to be presented on a media playback device; causing a verification code to be presented on the media playback device; detecting that the verification code has been provided on a page using a web browsing application executing on a mobile device; in response to the detection, causing additional content relating to the media content that is presented on the media playback device to be presented on the mobile device and causing a user interface element to be presented on the mobile device that, when selected, causes live media content associated with a second content feed of the event to be presented on the media playback device; and in response to determining that the user interface element has been selected, causing the presentation of the live media content associated with the first content feed of the event to no longer be presented and causing the live media content associated with the second content feed of the event to be presented.

In accordance with some embodiments of the disclosed subject matter, systems for providing media guidance are provided, the systems comprising: a hardware processor that is programmed to: cause live media content associated with a first content feed of an event to be presented on a media playback device; cause a verification code to be presented on the media playback device; detect that the verification code has been provided on a page using a web browsing application executing on a mobile device; in response to the detection, cause additional content relating to the media content that is presented on the media playback device to be presented on the mobile device and cause a user interface element to be presented on the mobile device that, when selected, causes live media content associated with a second content feed of the event to be presented on the media playback device; and in response to determining that the user interface element has been selected, cause the presentation of the live media content associated with the first content feed of the event to no longer be presented and causing the live media content associated with the second content feed of the event to be presented.

In accordance with some embodiments of the disclosed subject matter, non-transitory computer-readable media containing computer executable instructions that, when executed by a processor, cause the processor to perform a method for providing media guidance are provided, the method comprising: causing live media content associated with a first content feed of an event to be presented on a media playback device; causing a verification code to be presented on the media playback device; detecting that the verification code has been provided on a page using a web browsing application executing on a mobile device; in response to the detection, causing additional content relating to the media content that is presented on the media playback device to be presented on the mobile device and causing a user interface element to be presented on the mobile device that, when selected, causes live media content associated with a second content feed of the event to be presented on the media playback device; and in response to determining that the user interface element has been selected, causing the presentation of the live media content associated with the first content feed of the event to no longer be presented and causing the live media content associated with the second content feed of the event to be presented.

In accordance with some embodiments of the disclosed subject matter, a system for providing media guidance is provided, the system comprising: means for causing live media content associated with a first content feed of an event to be presented on a media playback device; causing a verification code to be presented on the media playback device; means for detecting that the verification code has been provided on a page using a web browsing application executing on a mobile device; in response to the detection, means for causing additional content relating to the media content that is presented on the media playback device to be presented on the mobile device and means for causing a user interface element to be presented on the mobile device that, when selected, causes live media content associated with a second content feed of the event to be presented on the media playback device; and in response to determining that the user interface element has been selected, means for causing the presentation of the live media content associated with the first content feed of the event to no longer be presented and means for causing the live media content associated with the second content feed of the event to be presented.

In some embodiments, the user interface element is presented in a map representing a location of a camera associated with the second content feed of the event.

In some embodiments, the additional content includes information about the event associated with the live media content.

In some embodiments, the additional content includes an interactive poll associated with the live media content.

In some embodiments, the additional content includes one or more items related to the live media content that are available for purchase.

In some embodiments, the system further comprises: means for receiving, from the mobile device, an indication that a time point associated with the live media content is to be bookmarked; means for storing a first indication of the time point in association with the first content feed; and means for storing a second indication of the time point in associated with the second content feed.

In some embodiments, the system further comprises: means for receiving, from the mobile device, an indication that the live media content is to be presented based on the time point from the first content feed; and means for presenting a suggestion that the live media content be viewed based on the time point from the second content feed.

In some embodiments, the mobile device is used to control playback of the presentation of the live media content on the media playback device.

In some embodiments, the system further comprises means for determining whether the additional content is to be presented on the media playback device or the mobile device, wherein causing the additional content to be presented on the mobile device is in response to determining that the additional content is to be presented on the mobile device

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1A:
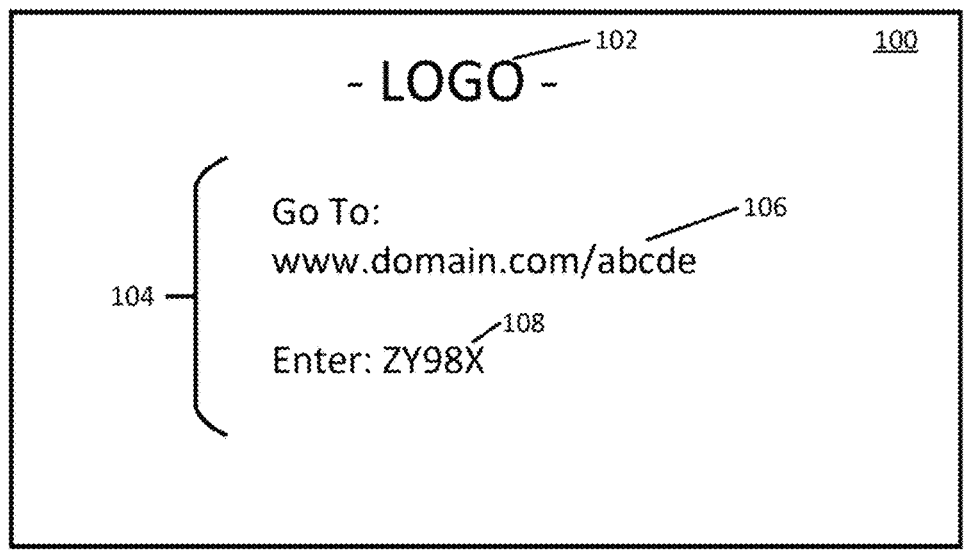
FIGS. 1A and 1B show examples of user interfaces for establishing an association between a mobile device and a media playback device using a verification code in accordance with some embodiments of the disclosed subject matter.

In accordance with various embodiments, mechanisms (which can include methods, systems, and media) for providing media guidance are provided.

Generally speaking, the mechanisms described herein can provide media guidance by presenting media content on a media playback device, such as video content of a live event being presented on a television device, and, upon launching an application executing on an associated mobile device, presenting additional content on the mobile device related to the media content being presented on the media play back device, such as a preview of additional content provided by a related content feed, biographical information relating to the entities appearing in the media content being presented on the media playback device, etc. In some embodiments, the application executing on the mobile device can be used to control the content being presented on the media playback device (e.g., switching to a related content feed).

In accordance with some embodiments, the mechanisms described herein can cause media content (e.g., live content, pre-recorded content, video content, audio content, and/or any other suitable type of media content) to be presented on a media playback device. The mechanisms described herein can then provide options for presenting the media content associated with a different content feed on a mobile device that is associated with the media playback device. In some embodiments, in response to determining that an alternative content feed has been selected on the mobile device, the mechanisms can present the media content associated with the alternative content feed on the media playback device. For example, while watching video of a live concert event from a live video stream on a media playback device, the mechanisms can provide the user with options to view alternate views of the live concert event from different live video streams or receive alternative content from other content streams (e.g., alternative commentary) on the mobile device and/or the media playback device.

Additionally, in some embodiments, the mechanisms described herein can indicate the availability of additional content related to the media content on the mobile device. In some embodiments, the additional content can include information related to the media content (e.g., information about an event associated with the media content, a map of the devices associated with the live content feeds, and/or any other suitable information), an opportunity to purchase items related to the media content, and/or any other suitable additional content. As a specific example, if the media content relates to a live music festival, the additional content can include information about songs being performed at the music festival, artist information about the performers on each stage of the music festival, opportunities to purchase audio files of the songs performed at the music festival, and/or any other suitable additional content. As another specific example, if the media content relates to a sporting event, the additional content can include information about players in the game, statistics about the game, and/or any other suitable content.

In some embodiments, the mechanisms described herein can correlate the user interaction with each of the content feeds. For example, the mechanisms described herein can receive an indication of a user-specified time point associated with the media content in a particular content feed (e.g., one camera view of a live concert event) that is to be stored as a bookmark in that content feed. In some embodiments, the mechanisms can cause an indication of the time point to be stored in association with identifiers of any available content feeds associated with the media content. For example, in some embodiments, the indication of the time point can be stored in association with an identifier of the content feed used to present the media content on the media playback device, as well as identifiers of content feeds that were not used to present the media content on the media playback device (e.g., bookmarks in associated content feeds). In such embodiments, the mechanisms can allow a user to view the media content from the user-specified time point from any of the available content feeds.

Turning to FIG. 1A, an example 100 of a user interface for presenting a verification code on a media playback device is shown in accordance with some embodiments of the disclosed subject matter. For example, in response to accessing a content source on a media playback device, the media playback device can present user interface 100 that includes a verification code to access additional or supplemental content on a different device. In a more particular example, user interface 100 can be presented in response to watching a live concert on the media playback device. As illustrated, user interface 100 can include a logo 102 and instructions 104.

Logo 102 can be any suitable logo associated with a provider of user interface 100. In some embodiments, logo 102 can include any suitable text, images, icons, graphics, videos, and/or any other suitable content. Note that the position of logo 102 in user interface 100 is shown as an example, and logo 102 can be located at any suitable position. In some embodiments, logo 102 can be omitted.

Instructions 104 can be any suitable content for instructing a user of a mobile device to enter a verification code. In some embodiments, instructions 104 can include web site indicator 106 and verification code 108. In some embodiments, web site indicator 106 can indicate a web site at which verification code 108 can be entered. In some embodiments, web site indicator 106 can be omitted. In some embodiments, verification code 108 can be any suitable indicator of a verification code to be entered on a mobile device. For example, as shown in FIG. 1A, verification code 108 can include a sequence of characters (e.g., letters, numbers, and/or any other suitable characters or combination of characters) of any suitable length (e.g., one, two, five, ten, and/or any other suitable length).

Figure 1B:
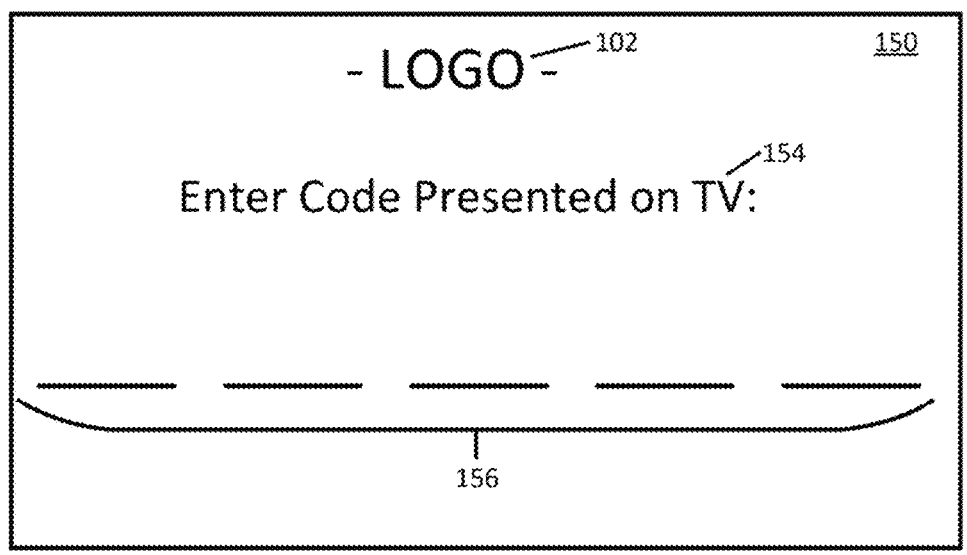

Turning to FIG. 1B, an example 150 of a user interface for entering a verification code on a mobile device (e.g., within a web browsing application, and/or in any other suitable manner) is shown in accordance with some embodiments of the disclosed subject matter. In some embodiments, user interface 150 can include instructions 154 and character inputs 156. In some embodiments, instructions 154 can include any suitable text instructing a user of the mobile device to enter the verification code presented on a media playback device (e.g., as shown in FIG. 1A). In some embodiments, character inputs 156 can include any suitable number of inputs corresponding to a length of verification code 108. In some embodiments, characters can be entered into character inputs 156 using any suitable input device (e.g., with a keyboard, with a keypad, with a microphone, and/or any other suitable input device).

In some embodiments, after verification code 108 has been entered on the mobile device, user interfaces presenting additional content related to media content being presented on a media playback device and/or user interfaces for controlling playback of the media content can be presented on the mobile device, as shown in FIGS. 2A-2D. Note that although the embodiments shown in FIGS. 2A-2D relate to media content associated with a live concert event, in some embodiments, the media content can be associated with any suitable event and/or entity. For example, in some embodiments, the media content can be associated with a live sporting event, a live news event (e.g., a speech, a debate, and/or any other suitable news event), a live fashion show, and/or any other suitable live event. As another example, in some embodiments, the media content can be associated with a recorded event or other pre-recorded content.

Figure 2A:
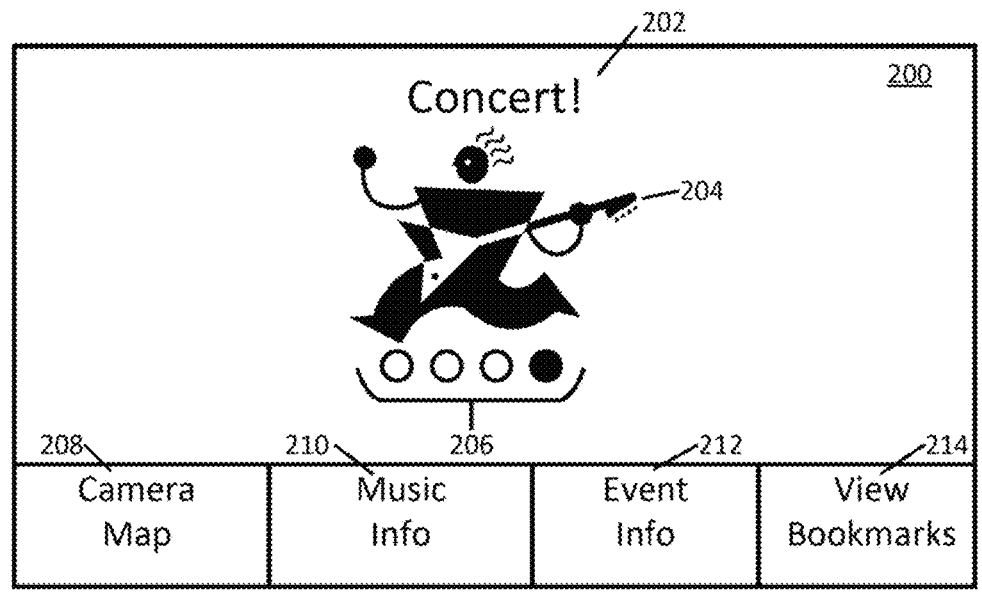
FIGS. 2A-2D show examples of user interfaces that can be presented on a mobile device that present additional content related to a live concert event presented on a media playback device in accordance with some embodiments of the disclosed subject matter.

FIG. 2A shows an example 200 of a user interface for presenting, on a mobile device, a menu of available additional content related to media content being presented on a media playback device. As illustrated, user interface 200 can include a title 202, an image 204, an image selector 206, and one or more selectable inputs representing additional content, such as selectable inputs 208, 210, 212, and/or 214.

Title 202 can be any suitable indicator of content included in user interface 200. In some embodiments, title 202 can include any suitable text, images, icons, graphics, animations, and/or any other suitable content. Note that the position of title 202 within user interface 200 is shown as an example, and title 202 can be located at any suitable position. In some embodiments, title 202 can be omitted.

Image 204 can be any suitable image related to media content being presented on the media playback device. For example, in some embodiments, image 204 can include a screenshot from a video being presented on the media playback device. In some embodiments, image 204 can include images associated with a creator and/or a producer of the media content. Note that, in some embodiments, image 204 can be a video associated with the media content. For example, in some embodiments, image 204 can be a video recorded from any suitable camera feed. In some embodiments, image 204 can be omitted.

Image selector 206 can be any suitable indicator that shows multiple images available for presentation. For example, as shown in FIG. 2A, image selector 206 can indicate that a particular number of images associated with the live event are available, and the last image in the collection of images is being presented (e.g., image 204). In some embodiments, selection of a particular indicator within image selector 206 can cause the associated image to be presented in place of image 204. Additionally or alternatively, in some embodiments, touching, swiping, clicking, and/or any other suitable interaction with image 204 can cause an alternative image to be presented in place of image 204. In some embodiments, image selector 206 can be omitted.

Selectable inputs 208, 210, 212, and/or 214 can indicate any suitable additional content related to the media content being presented on the media playback device and/or any available options for controlling playback of the media content on the media playback device. For example, selectable input 208 can, upon selection, present a map indicating locations of multiple cameras recording the live media content (e.g., as shown in and described below in connection with FIG. 2B). As another example, selectable input 210 can, upon selection, present information related to the media content, such as information related to an artist performing at a live concert event, a song being performed by the artist, and/or any other suitable media content (e.g., as shown in and described below in connection with FIG. 2C). As yet another example, selectable input 212 can, upon selection, present information related to an event associated with the media content, such as information related to a live concert event being presented, and/or any other suitable media content (e.g., as shown in and described below in connection with FIG. 2D). As still another example, selectable input 214 can, upon selection, present indications of one or more user-indicated time points in the media content to be presented, for example, as described below in connection with FIGS. 3A and 3B.

Figure 2B:
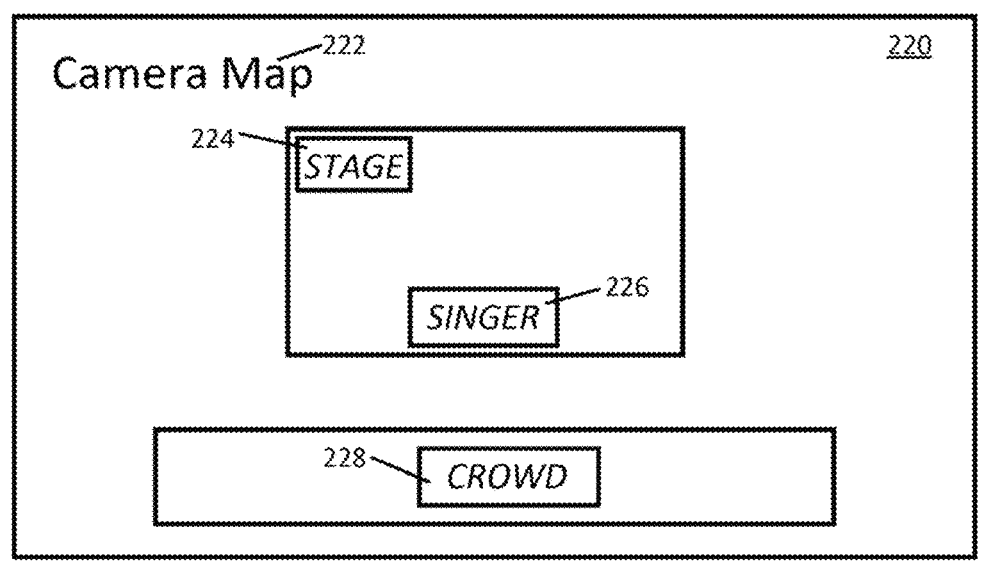

Turning to FIG. 2B, an example 220 of a user interface for presenting a map of locations of one or more cameras recording the media content being presented on the media playback device is shown in accordance with some embodiments of the disclosed subject matter. In some embodiments, user interface 220 can be presented in response to determining that selectable input 208 of FIG. 2A has been indicated. As illustrated, user interface 220 can include a title 222 and one or more indications of camera locations, such as stage camera indicator 224, singer camera indicator 226, and crowd camera indicator 228.

Title 222 can include any suitable indication of the content of user interface 220. For example, in some embodiments, title 222 can indicate that selection of one of indicators 224-228 can cause a camera feed associated with the media content being presented on the media playback device to change. In some embodiments, title 222 can include any suitable text, images, icons, graphics, and/or any other suitable content. In some embodiments, title 222 can be omitted.

Indicators 224-228 can include any suitable indication of locations and/or targets of one or more cameras associated with the media content being presented on the media playback device. For example, as shown in FIG. 2B, the cameras providing the live video feeds can correspond to a stage, a lead singer, another band member (e.g., a lead guitarist), a crowd (e.g., an audience at a concert), and/or any other suitable locations. Furthermore, as shown in FIG. 2B, in some embodiments, indicators 224-228 can be presented in a map indicating relative locations of the one or more cameras. Additionally or alternatively, in some embodiments, indicators 224-228 can be presented in any other suitable format (e.g., a list, a table, and/or any other suitable format). In some embodiments, indicators 224-228 can include selectable inputs, selection of which can cause the media playback device to begin presenting the media content from the indicated camera feed. As a specific example, if the media content is currently being presented from a camera corresponding to a stage location, selection of crowd indicator 228 can cause the media content to be presented using a camera in a location associated with the crowd and/or the audience (e.g., directed at the audience, located within the audience, and/or any other suitable location associated with the audience).

It should be noted that although the embodiments described herein generally relate to the selection of a live video stream from multiple cameras or imaging devices, any suitable content stream can be selected. For example, user interface 220 can allow the user to select from different live audio streams, such as descriptions or discussions of the live event from different commentators.

Figure 2C:
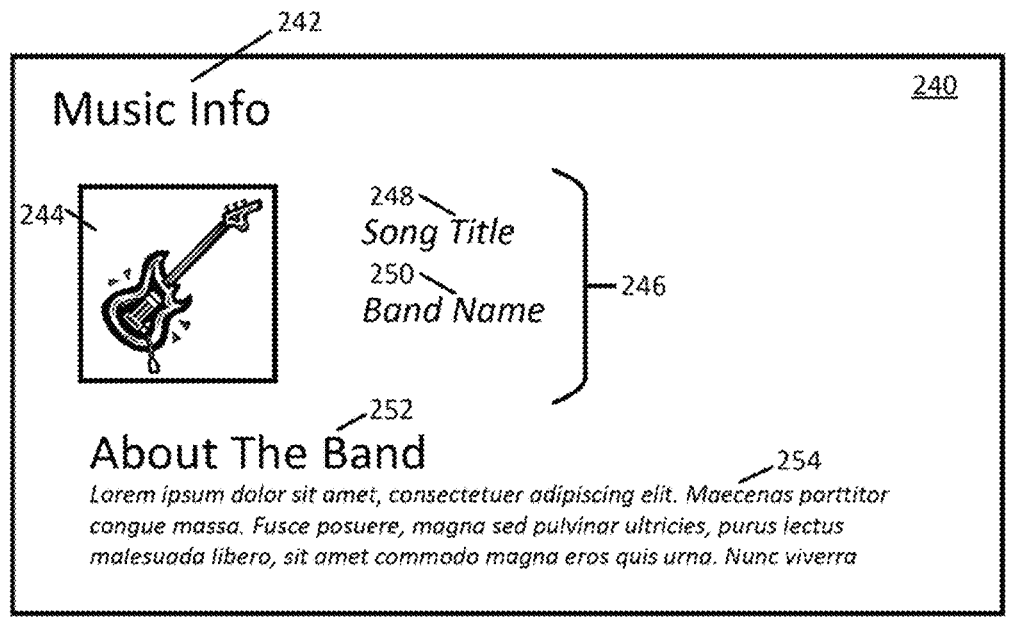

Turning to FIG. 2C, an example 240 of a user interface for presenting, on the mobile device, additional content related to a live concert event being presented on the media playback device is shown in accordance with some embodiments of the disclosed subject matter. In some embodiments, user interface 240 can be presented in response to determining that selectable input 210 of FIG. 2A has been indicated. As illustrated, user interface 240 can include a title 242, an image 244, information 246, and text 252.

Title 242 can be any suitable indicator of the content of user interface 240. For example, as shown in FIG. 2C, title 242 can indicate that user interface 240 includes information about music being presented on the media playback device. In some embodiments, title 242 can include any suitable text, images, icons, graphics, and/or any other suitable content. In some embodiments, title 242 can be omitted.

Image 244 can be any suitable image associated with the media content being presented. In some embodiments, image 244 can include any suitable text, graphics, icons, animations, videos, and/or any other suitable content. Note that although only one image is shown in user interface 240, in some embodiments, any suitable number (e.g., one, two, four, and/or any other suitable number) can be included. In instances where multiple images are included in image 244, the multiple images can be presented in any suitable manner (e.g., in a gallery, in a slideshow, in a row, in a matrix, and/or any other suitable manner). In some embodiments, image 244 can be omitted.

Information 246 can include any suitable information related to the media content. For example, as shown in FIG. 2C, information 246 can include a song title 248 and a band name 250. In some embodiments, any other suitable information can be included in information 246, such as a name of a singer, a year of production, and/or any other suitable information. In some embodiments, information 246 can be omitted.

Text 252 can include any other suitable information related to the media content. In some embodiments, text 252 can additionally include any suitable images, videos, icons, graphics, hyperlinks, and/or any other suitable content. In some embodiments, text 252 can be omitted.

Figure 2D:
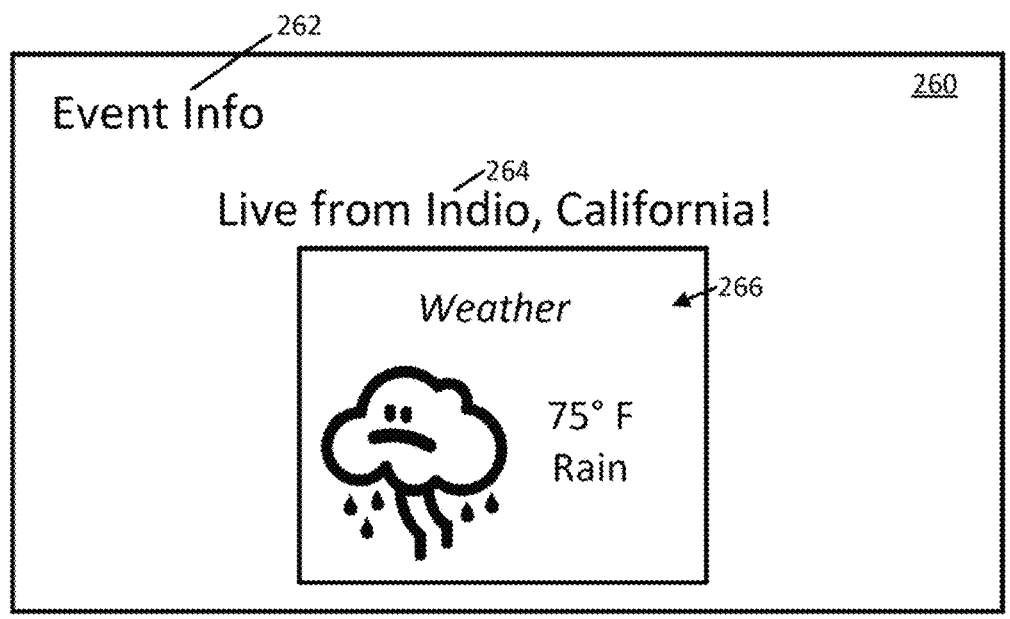

Turning to FIG. 2D, an example 260 of a user interface for presenting, on the mobile device, information related to an event associated with a live concert event being presented on the media playback device is shown in accordance with some embodiments of the disclosed subject matter. In some embodiments, user interface 260 can be presented in response to determining that selectable input 212 of FIG. 2A has been indicated. As illustrated, user interface 260 can include a title 262, text 264, and information 266.

Title 262 can be any suitable indicator of the content of user interface 260. In some embodiments, title 262 can include any suitable text, images, icons, graphics, and/or any other suitable content. In some embodiments, title 262 can be omitted.

Text 264 can include any suitable text related to an event associated with the media content being presented. For example, text 264 can indicate a location (e.g., a city, a state, a country, and/or any other suitable location) of the event, a time (e.g., a date, a time at which the event started, and/or any other suitable time) associated with the event, and/or any other suitable information. In some embodiments, text 264 can be omitted.

Information 266 can include any suitable information related to the event. For example, as shown in FIG. 2D, information 266 can include current weather at the event. In some embodiments, information 266 can include any other suitable information about the event, such as a number of spectators at the event, traffic conditions at and/or near the event, and/or any other suitable information. Note that although only one item of information is included in information 266, in some embodiments, any suitable number (e.g., two, four, ten, and/or any other suitable number) of items can be included. In instances where multiple items of information are presented, the multiple items can be presented in any suitable manner (e.g., in a row, in a column, in a matrix, in a gallery, in a slideshow, and/or in any other suitable manner). Additionally or alternatively, in some embodiments, information 266 can include a hyperlink that, when selected, causes a web page related to information 266 to be presented.

Figure 3A:
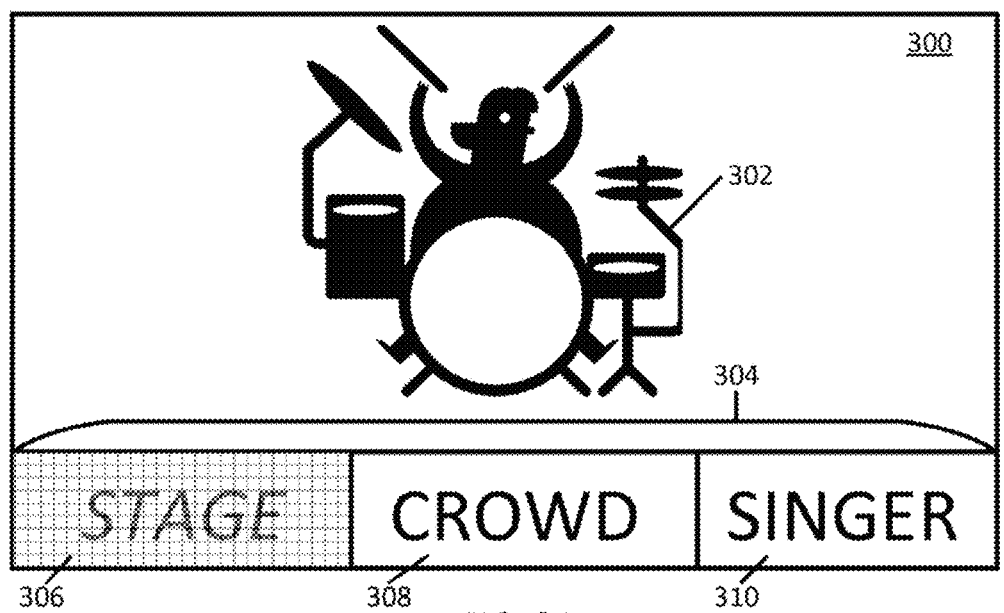
FIGS. 3A and 3B show examples of user interfaces that present the media content from different camera feeds in accordance with some embodiments of the disclosed subject matter.
Figure 3B:
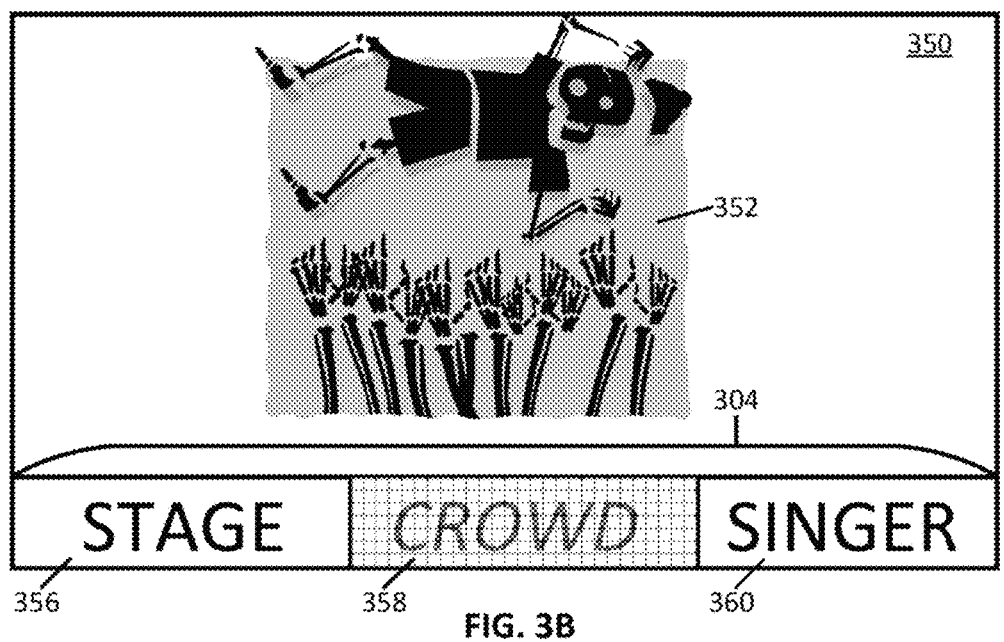

Turning to FIGS. 3A and 3B, examples 300 and 350 of user interfaces for presenting, on a media playback device, media content associated with different content feeds are shown in accordance with some embodiments of the disclosed subject matter. As shown, user interfaces 300 and 350 can include media content (e.g., media content 302 and/or 352), available feed indicator 304, and camera indicators (e.g., camera indicators 306-310 and camera indicators 356-360).

Media content 302 and/or 352 can be any suitable media content associated with any suitable recording device (e.g., a camera, a microphone, and/or any other suitable device). In some embodiments, media content 302 and/or 352 can be presented within a video player with video controls (e.g., a pause input, a volume input, a rewind input, a fast-forward input, and/or any other suitable controls). Note that, although media content 302 and 352 are shown as being video content, in some embodiments, media content 302 and/or 352 can include audio content, and/or any other suitable media content.

Available feed indicator 304 can indicate one or more cameras that have recorded and/or are recording media content that are available for viewing the media content (e.g., video content 302 and/or 352). As shown in FIGS. 3A and 3B, available feed indicator 304 can include any suitable camera indicators, such as camera indicators 306-310 and camera indicators 356-360. As described above in connection with FIG. 2B, the camera indicators can correspond to any suitable recording locations and/or targets, such as a stage, a crowd and/or audience, a particular person on a stage, and/or any other suitable locations and/or targets. Furthermore, as shown in FIGS. 3A and 3B, in some embodiments, a particular camera indicator associated with media content currently being presented can be highlighted within available feed indicator 304 in any suitable manner. For example, as shown in FIG. 3A, camera indicator 306 (corresponding to a "stage" camera location) can be highlighted (e.g., shaded, presented in a different color relative to other camera indicators, and/or highlighted in any other suitable manner) to indicate that associated media content 302 was recorded from a camera corresponding to the "stage" location and/or target.

Note that, in instances where media content 302 and/or 352 correspond to audio content, camera indicators 306-310 and/or camera indicators 356-360 can indicate locations of any other suitable recording equipment, such as microphones.

Figure 4A:
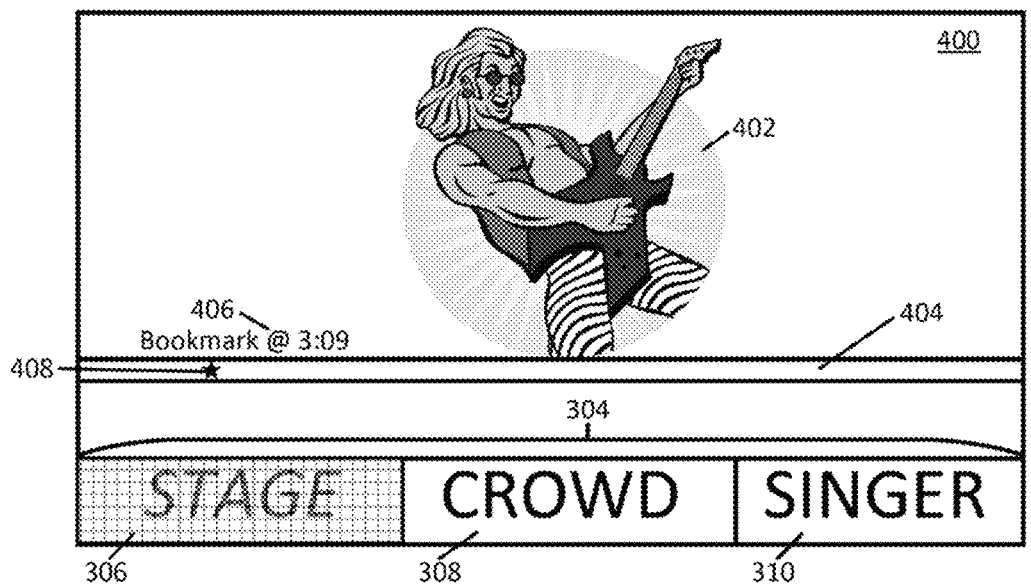
FIGS. 4A and 4B show examples of user interfaces for indicating a bookmarked time point in a presentation of media content in accordance with some embodiments of the disclosed subject matter.
Figure 4B:
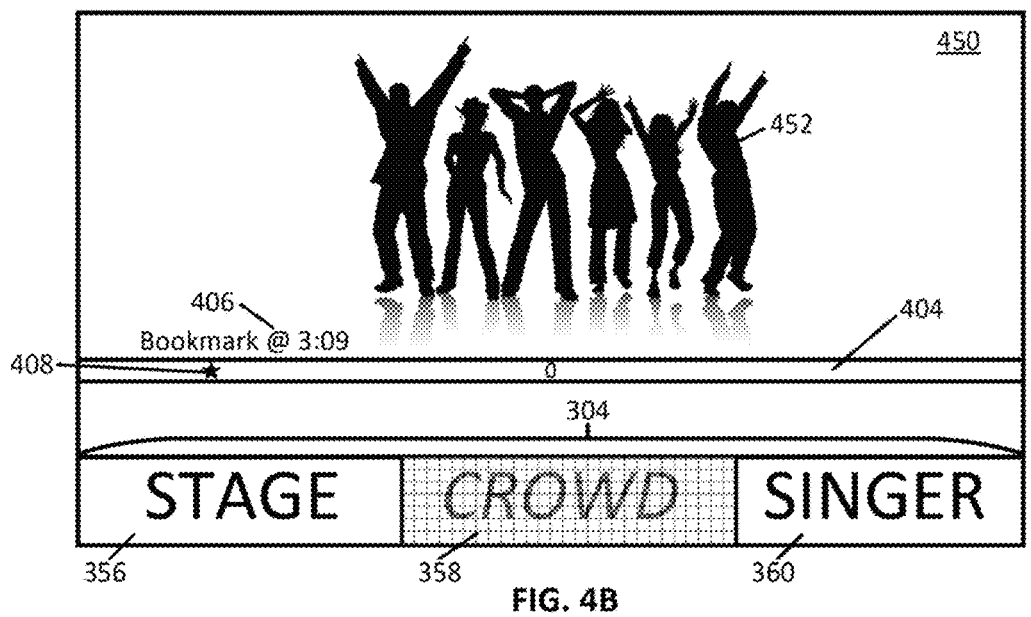

Turning to FIGS. 4A and 4B, examples 400 and 450 of user interfaces including user-indicated bookmarks of media content are shown in accordance with some embodiments of the disclosed subject matter. As illustrated, user interfaces 400 and 450 can include media content (e.g., media content 402 and/or 452), media content timeline 404, and one or more bookmark indicators such as bookmark tag 406 and bookmark icon 408.

Similarly to media content 302 and 352, media content 402 and 452 can include any suitable media content, such as video content and/or audio content. As shown in FIGS. 4A and 4B, media content 402 and 452 can be recorded from different cameras (e.g., from a camera corresponding to a "stage" location as in FIG. 4A and from a camera corresponding to a "crowd" location as in FIG. 4B).

Media content timeline 404 can be any suitable timeline indicating a duration of a media content item currently being presented. In some embodiments, media content timeline 404 can include any suitable information, such as a duration of the media content item, an indication of a duration remaining in the presentation of the media content item, and/or any other suitable information. In some embodiments, media content timeline 404 can be omitted.

Bookmark tag 406 and/or bookmark icon 408 can indicate a user-specified time point within the media content item. For example, in some embodiments, the user-specified time point can be indicated from a mobile device (e.g., in response to a particular button being selected, and/or in response to any other suitable input). In some embodiments, bookmark tag 406 and/or bookmark icon 408 can indicate the user-specified time point in any suitable manner. For example, as shown in FIGS. 4A and 4B, bookmark tag 406 can include text that indicates the user-specified time point. As another example, as shown in FIGS. 4A and 4B, bookmark icon 408 can be presented at a location along media content timeline 404 that represents the user-specified time point. Note that, in some embodiments, the time point can be specified based on a presentation from a particular camera feed (e.g., the camera corresponding to the "stage" location of FIG. 4A) and the time point can additionally be indicated in a presentation of media content corresponding to a different camera feed (e.g., the camera corresponding to the "crowd" location of FIG. 4B). The user-specified time point can be received and stored using any suitable technique(s), such as those described below in connection with FIG. 8.

Turning to FIGS. 5A-5D, examples of user interfaces for presenting additional content on a mobile device in an instance where the media content is associated with a live sporting event are shown in accordance with some embodiments of the disclosed subject matter.

Figure 5A:
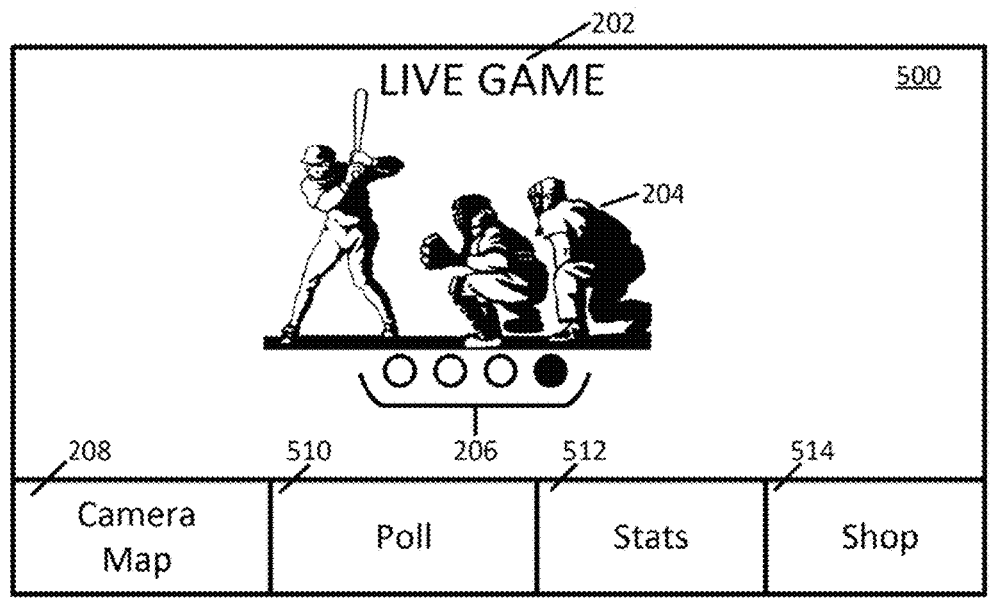
FIGS. 5A-5D show examples of user interfaces that can be presented on a mobile device that present additional content related to a sporting event presented on a media playback device in accordance with some embodiments of the disclosed subject matter.

FIG. 5A shows an example 500 of a user interface for presenting a menu of additional content available on a mobile device in accordance with some embodiments of the disclosed subject matter. As illustrated, user interface 500 can include selectable inputs 510, 512, and 514 that represent additional content related to the media content (e.g., a sporting event, and/or any other suitable media content) being presented on the media playback device. As shown in FIG. 5A, selectable input 510 can indicate an available poll related to the media content, selectable input 512 can indicate additional content of statistics related to the media content, and selectable input 514 can indicate that one or more items related to the media content are available for purchase. Note that, in some embodiments, any suitable number (e.g., one, two, five, and/or any other suitable number) of selectable inputs can be included in user interface 500.

Figure 5B:
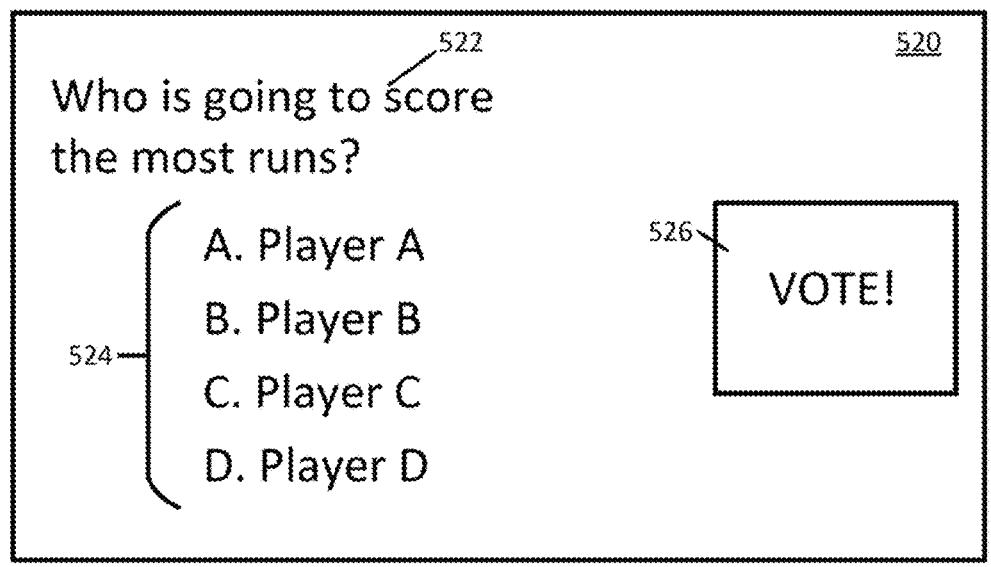

FIG. 5B shows an example 520 of a user interface that presents a poll related to the media content being presented in accordance with some embodiments of the disclosed subject matter. In some embodiments, user interface 520 can be presented in response to determining that selectable input 510 has been indicated. As illustrated, user interface 520 can include a question 522, a collection of answers 524, and a vote input 526.

Question 522 can include any suitable text related to a poll presented in user interface 520. In some embodiments, question 522 can include any suitable images, icons, graphics, animations, and/or any other suitable content. In some embodiments, question 522 can be omitted.

Collection of answers 524 can include any suitable options related to the poll presented in user interface 520. For example, as shown in FIG. 5B, collection of answers 524 can include a collection of text that represent different answers to question 522. In some embodiments, each item in collection of answers 524 can be a selectable input, selection of which can cause the corresponding item to be registered as a response from a user of the mobile device. In some embodiments, an item within collection of answers 524 can include any suitable text, images, icons, graphics, animations, hyperlinks, and/or any other suitable content.

Vote input 526 can be any suitable selectable input for causing one or more items indicated in collection of answers 524 to be registered as a response to question 522. In some embodiments, vote input 526 can be omitted.

Figure 5C:
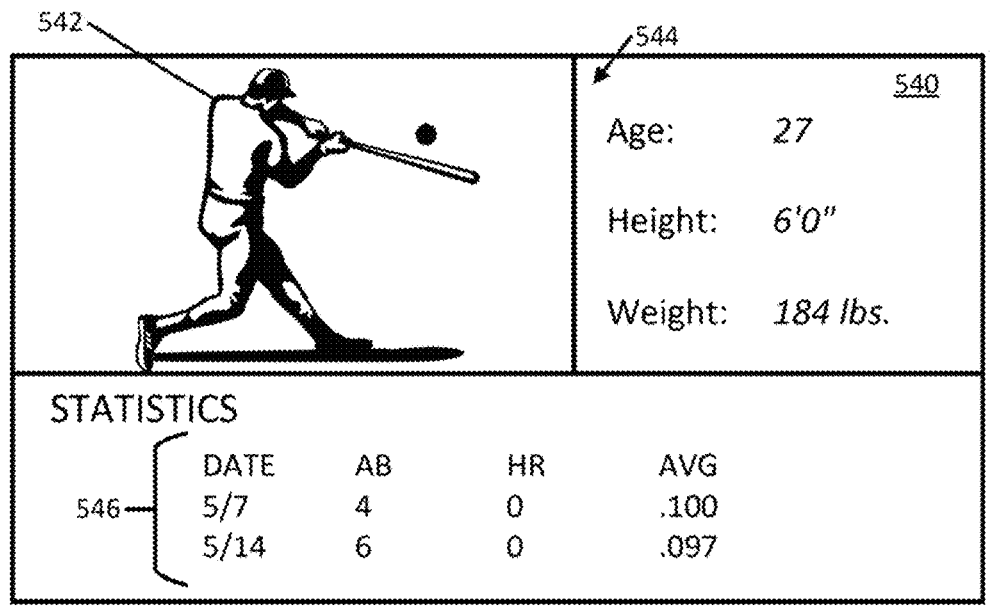

Turning to FIG. 5C, an example 540 of a user interface for presenting statistics related to the media content (e.g., a sporting event) being presented on the media playback device is shown in accordance with some embodiments of the disclosed subject matter. In some embodiments, user interface 540 can be presented in response to determining that selectable input 512 of FIG. 5A has been indicated. In some embodiments, the statistics can be associated with a particular player associated with the sporting event being presented, as shown in FIG. 5C. Additionally or alternatively, in some embodiments, the statistics can be associated with a particular sports team associated with the sporting event. As illustrated, user interface 540 can include an image 542, player information 544, and statistics 546.

Image 542 can be any suitable image relating to the statistics presented in user interface 540. For example, image 542 can be an image of a particular player, of a team, a logo associated with a team, and/or any other suitable image. In some embodiments, image 542 can include any suitable text, icons, graphics, animations, video, and/or any other suitable content. In some embodiments, image 542 can be omitted.

Player information 544 can include any suitable information about a particular player associated with the statistics presented in user interface 540. For example, as shown in FIG. 5C, player information 544 can include information such as an age of the player, a height of the player, a weight of the player, and/or any other suitable information. In instances where the statistics presented in user interface 540 correspond to a group of players (e.g., a team), player information 544 can include any suitable information about the group, such as a list of players on the team, and/or any other suitable information.

Statistics 546 can include any suitable statistics related to any suitable entity (e.g., a particular player, a particular team, and/or any other suitable entity) associated with the sporting event being presented on the media playback device. For example, as shown in FIG. 5C, statistics 546 can include dates of previous games, total and/or average performance of a particular player at each game, and/or any other suitable information. In some embodiments, any suitable portion of statistics 546 (e.g., a date, a column heading, and/or any other suitable portion) can be hyperlinked. For example, in some embodiments, selection of a particular date can cause a web page associated with the game played on the particular date to be presented.

Figure 5D:
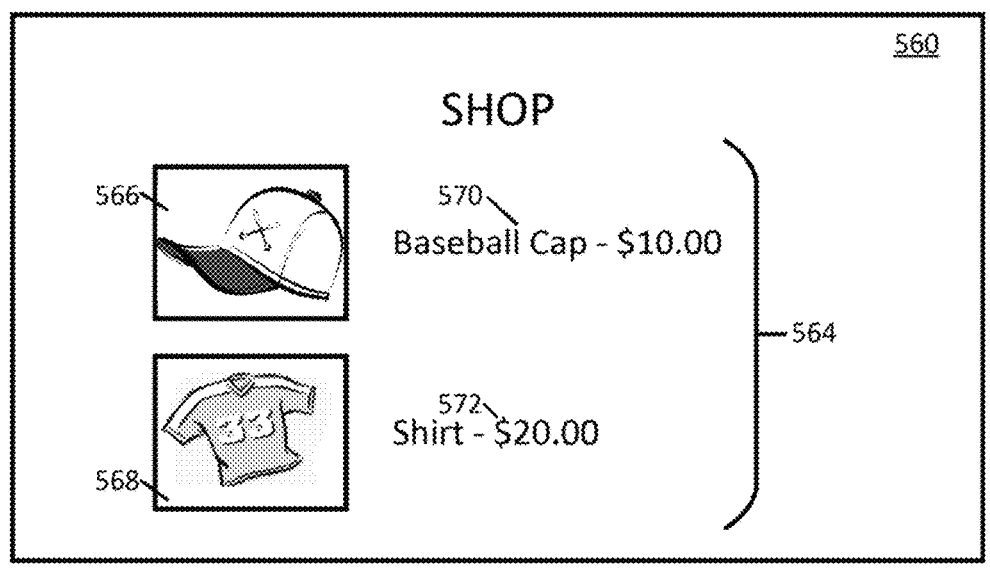

Turning to FIG. 5D, an example 560 of a user interface for presenting an indication that one or more items related to the media content being presented are available for purchase is shown in accordance with some embodiments of the disclosed subject matter. In some embodiments, user interface 560 can be presented in response to determining that selectable input 514 of FIG. 5A has been indicated. As illustrated, user interface 560 can include a collection of items 564 that are available for purchase.

Collection of items 564 can include any suitable number (e.g., one, two, four, ten, and/or any other suitable number) of items that are available for purchase from the mobile device presenting user interface 560. In some embodiments, each item can be associated with an image (e.g., images 566 and 568) and text (e.g., item text 570 and 572).

Images 566 and 568 can be any suitable images related to the items available for purchase. For example, in some embodiments, images 566 and 568 can be photographs of the available items. In some embodiments, images 566 and/or 568 can include any suitable text, icons, graphics, videos, hyperlinks, and/or any other suitable content. In some embodiments, images 566 and/or 568 can be omitted.

Item text 570 and 572 can be any suitable text related to the items available for purchase. For example, as shown in FIG. 5D, item text 570 and/or 572 can indicate a name of the item and/or a price of the item. In some embodiments, item text 570 and/or 572 can include one or more hyperlinks. In some such embodiments, selection of the hyperlink can cause an indication of the corresponding item to be registered as selected for purchase.

Figure 6:
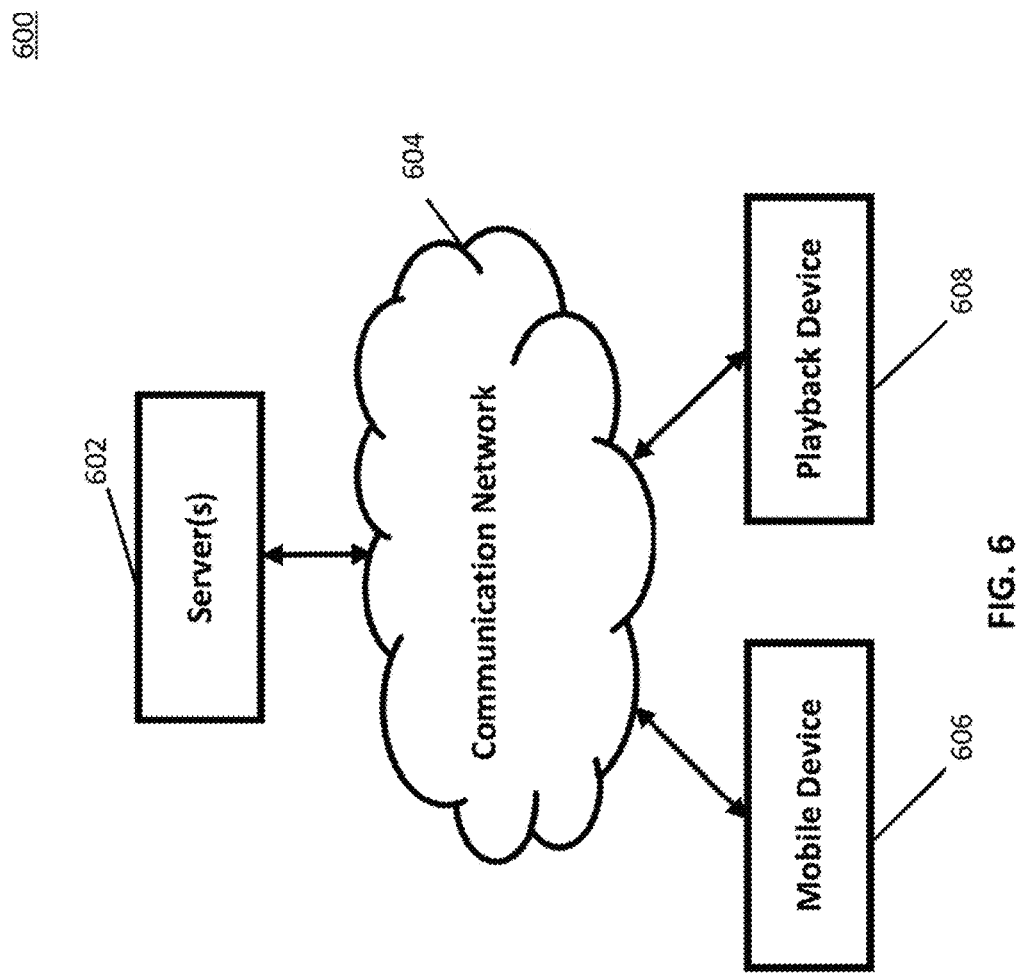
FIG. 6 shows a schematic diagram of an illustrative system suitable for implementation of mechanisms described herein for providing media guidance in accordance with some embodiments of the disclosed subject matter.

Turning to FIG. 6, an example 600 of hardware for providing media guidance that can be used in accordance with some embodiments of the disclosed subject matter is shown. As illustrated, hardware 600 can include one or more servers 602, a communication network 604, a mobile device 606, and a media playback device 608.

Server(s) 602 can be any suitable server(s) for storing and/or transmitting media content, storing and/or transmitting additional content related to the media content, and/or performing any other suitable functions. For example, in some embodiments, server(s) 602 can store media content uploaded by any suitable entity, and can transmit the media content to media playback device 608 via communication network 604. As another example, in some embodiments, server(s) 602 can store additional content related to a particular item of media content, and can transmit the additional content to mobile device 606 via communication network 604.

Communication network 604 can be any suitable combination of one or more wired and/or wireless networks in some embodiments. For example, communication network 604 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. Mobile device 606 and media playback device 608 can be connected by one or more communications links to communication network 604 that can be linked via one or more communications links to server(s) 602. The communications links can be any communications links suitable for communicating data among devices 606 and 608 and server(s) 602 such as network links, dial-up links, wireless links, hard-wired links, any other suitable communications links, or any suitable combination of such links.

Mobile device 606 can include any suitable user device for presenting additional content related to media content being presented on media playback device 608 and for controlling playback options of media content being presented on media playback device 608. For example, in some embodiments, mobile device 606 can present one or more options for camera feeds from which a media content item can be presented, and can cause the media content to be presented from a selected camera feed. In some embodiments, mobile device 606 can include a mobile phone, a tablet computer, a wearable computer, a laptop computer, and/or any other suitable mobile device.

Media playback device 608 can include any suitable user device for presenting media content from a first camera feed and for presenting the media content from a second camera feed in response to receiving an instruction from mobile device 606. For example, in some embodiments, media playback device 608 can include a television, a stereo, a projector, a game console, a desktop computer, and/or any other suitable media playback device.

Although server(s) 602 is illustrated as one device, the functions performed by server(s) 602 can be performed using any suitable number of devices in some embodiments. For example, in some embodiments, multiple devices can be used to implement the functions performed by server(s) 602.

Although one mobile device 606 and one media playback device 608 are shown in FIG. 6, any suitable number of devices, and/or any suitable types of devices, can be used in some embodiments.

Figure 7:
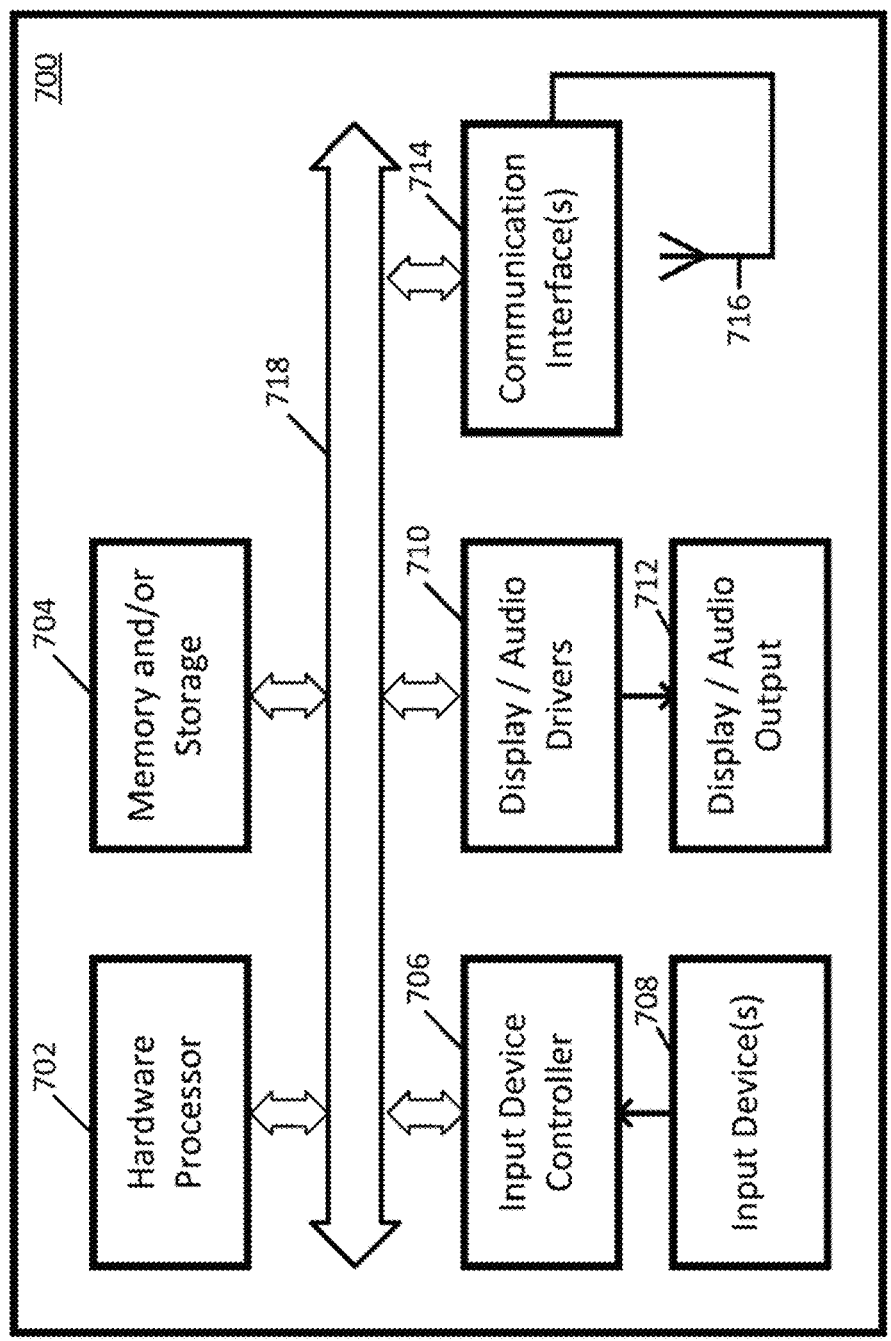
FIG. 7 shows a detailed example of hardware that can be used in a server and/or a user device of FIG. 6 in accordance with some embodiments of the disclosed subject matter.

Server(s) 602, mobile device 606, and media playback device 608 can be implemented using any suitable hardware in some embodiments. For example, in some embodiments, devices 602, 606, and 608 can be implemented using any suitable general purpose computer or special purpose computer. For example, a server (e.g., one of server(s) 602) may be implemented using a special purpose computer. Any such general purpose computer or special purpose computer can include any suitable hardware. For example, as illustrated in example hardware 700 of FIG. 7, such hardware can include hardware processor 702, memory and/or storage 704, an input device controller 706, an input device 708, display/audio drivers 710, display and audio output circuitry 712, communication interface(s) 714, an antenna 716, and a bus 718.

Hardware processor 702 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 702 can be controlled by a server program stored in memory and/or storage 704 of a server (e.g., such as one of server(s) 602). For example, in some embodiments, the server program can cause hardware processor 702 to transmit additional content to mobile device 606. As another example, in some embodiments, the server program can cause hardware processor 702 to cause media playback device 608 to begin presenting media content from an alternative camera feed based on an indication received from mobile device 606.

In some embodiments, hardware processor 702 can be controlled by a computer program stored in memory and/or storage 704 of mobile device 606. For example, the computer program can cause hardware processor 702 to present user interfaces containing additional content related to media content being presented on media playback device 608, and/or perform any other suitable actions.

In some embodiments, hardware processor 702 can be controlled by a computer program stored in memory and/or storage 704 of media playback device 608. For example, the computer program can cause hardware processor 702 to begin presenting a particular media content item from a first camera feed, stop presenting the media content item from the first camera feed and begin presenting the media content item from a second camera feed, and/or perform any other suitable actions.

Memory and/or storage 704 can be any suitable memory and/or storage for storing programs, data, media content, and/or any other suitable information in some embodiments. For example, memory and/or storage 704 can include random access memory, read-only memory, flash memory, hard disk storage, optical media, and/or any other suitable memory.

Input device controller 706 can be any suitable circuitry for controlling and receiving input from one or more input devices 708 in some embodiments. For example, input device controller 706 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 710 can be any suitable circuitry for controlling and driving output to one or more display/audio output devices 712 in some embodiments. For example, display/audio drivers 710 can be circuitry for driving a touchscreen, a flat-panel display, a cathode ray tube display, a projector, a speaker or speakers, and/or any other suitable display and/or presentation devices.

Communication interface(s) 714 can be any suitable circuitry for interfacing with one or more communication networks, such as network 604 as shown in FIG. 6. For example, interface(s) 714 can include network interface card circuitry, wireless communication circuitry, and/or any other suitable type of communication network circuitry.

Antenna 716 can be any suitable one or more antennas for wirelessly communicating with a communication network (e.g., communication network 604) in some embodiments. In some embodiments, antenna 716 can be omitted.

Bus 718 can be any suitable mechanism for communicating between two or more components 702, 704, 706, 710, and 714 in some embodiments.

Any other suitable components can be included in hardware 700 in accordance with some embodiments.

Figure 8:
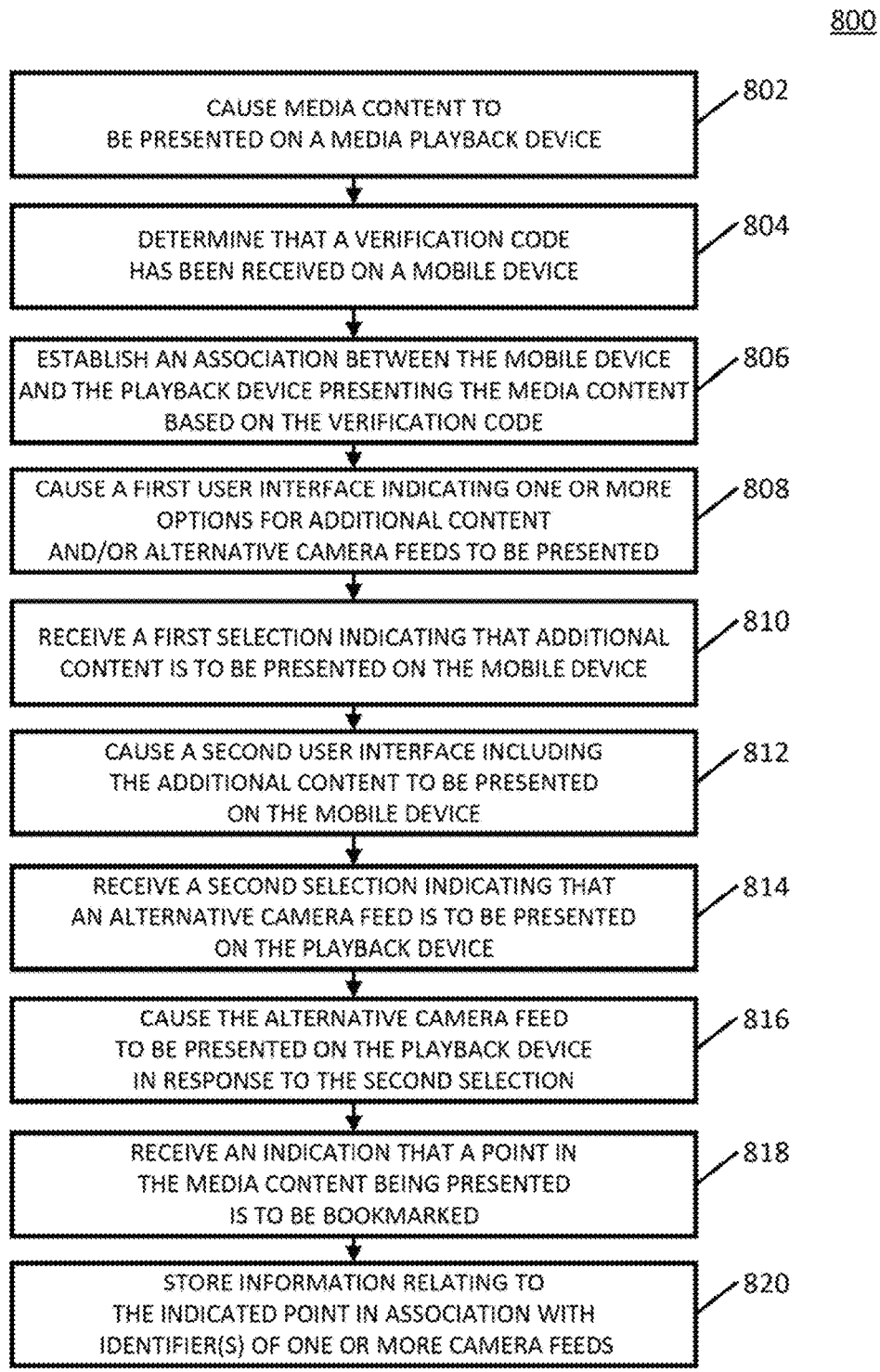
FIG. 8 shows an example of a process for presenting additional content related to a presentation of media content in accordance with some embodiments of the disclosed subject matter.

Turning to FIG. 8, an example 800 of a process for presenting, on a mobile device, options for controlling playback of media content and/or presenting additional content related to media content being presented on a media playback device is shown in accordance with some embodiments of the disclosed subject matter. In some embodiments, portions of process 800 can be implemented on server(s) 602.

Process 800 can cause media content to be presented on the media playback device at 802 using any suitable technique(s). For example, in some embodiments, process 800 can determine that a particular media content item has been selected (e.g., from a link on a web site, and/or in any other suitable manner), and process 800 can cause the media content item to be transmitted to media playback device via communication network 604 in response to the determination. As described above, the media content can include any suitable video content and/or audio content. Furthermore, in some embodiments, the media content can include any suitable live content and/or recorded content.

Process 800 can begin by determining that a verification code has been received by the mobile device at 804. As described above in connection with FIGS. 1A and 1B, in some embodiments, the verification code can be any suitable sequence of characters and can be entered on the mobile device, for example, through user interface 150 of FIG. 1B.

Additionally or alternatively, in some embodiments, verification can be provided in any other suitable manner. For example, in some embodiments, a microphone on the mobile device can be used to record audio content of the live event being presented on the media playback device, and process 800 can verify that the recorded audio content corresponds to the live event being presented on the media playback device. As another example, in some embodiments, a camera on the mobile device can be used to capture an image and/or a video of any suitable duration (e.g., a second, two seconds, five seconds, and/or any other suitable duration) of the live event being presented on the media playback device, and process 800 can verify that the recorded image and/or video correspond to the live event being presented on the media playback device.

Process 800 can establish an association between the mobile device and the media playback device based on the verification code at 806. The association can be established based on any suitable information. For example, in some embodiments, process 800 can determine that the verification code entered on the mobile device (e.g., as in user interface 150 of FIG. 1B) corresponds to the verification code presented on the media playback device (e.g., as in interface 100 of FIG. 1A), and can determine that the mobile device and the media playback device are to be associated based on the determination.

Process 800 can cause a first user interface indicating one or more options for additional content and/or alternative camera feeds to be presented at 808. An example of such a user interface is shown in and described above in connection with FIG. 2A. In some embodiments, process 800 can determine the one or more options for additional content and/or the alternative camera feeds available based on any suitable information. For example, in some embodiments, the media content being presented can be associated with information that indicates available options and/or available camera feeds, and process 800 can access the information to determine the available additional content and/or camera feeds. As a more particular example, in some embodiments, the available options and/or camera feeds can be specified in one or more user interfaces (e.g., as shown in and described below in connection with FIGS. 9A-9C), for example, by a creator and/or a producer of the media content.

Process 800 can receive a first selection indicating that additional content is to be presented on the mobile device at 810 based on any suitable information. For example, in some embodiments, process 800 can determine that a selectable input (e.g., one of selectable inputs 208-214 of FIG. 2A) has been indicated. As described above in connection with FIGS. 2A-2D and FIGS. 5A-5D, the additional content can include any suitable content related to the media content being presented on the media playback device. For example, in instances where the media content is a live concert event, the additional content can include information about the music being performed (e.g., as in FIG. 2C), information about the concert (e.g., as in FIG. 2D), one or more links to purchase music played at the concert, and/or any other suitable additional content.

Process 800 can cause the additional content to be presented using any suitable technique(s) at 812. For example, in some embodiments, the additional content can be specified by a producer of the media content via a user interface (e.g., as shown in and described below in connection with FIGS. 9A-9C), and process 800 can access the information acquired through the user interface(s) to identify the additional content and/or links to the additional content. Process 800 can then cause the user interface containing the additional content to be transmitted to the mobile device via communication network 604.

Note that, in some embodiments, process 800 can determine whether the additional content is to be presented on the mobile device and/or on the media playback device prior to causing the additional content to be presented. For example, in some embodiments, process 800 can determine that additional content that requires interaction from a user, such as a poll, opportunities to purchase items, and/or any other suitable additional content, is to be presented on the mobile device. As another example, in some embodiments, process 800 can determine that additional content related to information about a live event (e.g., information about a location associated with the event, information about a song performed at a concert event, and/or any other suitable additional content) is to be presented on the media playback device. In some embodiments, in instances where process 800 determines that additional content is to be presented on the media playback device, process 800 can additionally determine a duration (e.g., one minute, two minutes, five minutes, and/or any other suitable duration) that the additional content is to be presented on the media playback device.

Process 800 can receive a second selection indicating that the media content is to be presented from an alternative camera feed on the media playback device at 814 based on any suitable information. For example, in some embodiments, process 800 can determine that one of camera indicators 224-228 of FIG. 2B has been selected. In some embodiments, process 800 can identify a particular alternative camera feed based on information associated with the received selection. As a specific example, if process 800 determines that camera indicator 224 of FIG. 2B has been selected, process 800 can determine that the selected alternative camera feed corresponds to a camera associated with a "stage" location and/or target. In some embodiments, process 800 can additionally identify an associated identifier and/or Uniform Resource Locator (URL) associated with the selected alternative camera feed, as described below in connection with FIG. 9C.

Process 800 can cause the media content to be presented using the selected alternative camera feed on the media playback device at 816 using any suitable technique(s). For example, in some embodiments, process 800 can cause the media content from the first camera feed to be paused and/or stopped and can then cause the media content to resume using content recorded from the selected alternative camera feed. In some embodiments, process 800 can indicate which camera feed the media content is being presented from, as shown in and described above in connection with FIGS. 3A and 3B.

Process 800 can receive an indication that a point in the media content being presented is to be bookmarked at 818. As described above in connection with FIGS. 4A and 4B, the indication can be received based on any suitable input. For example, in some embodiments, the indication can be received based on a determination that a particular input (e.g., a particular button, a particular key press, and/or any other suitable input) has been received on the mobile device. In some embodiments, process 800 can determine a time point at which the indication is received. As a specific example, process 800 can determine that the indication was received at a particular time after presentation of the media content began. As another specific example, in instances where the media content includes live content, process 800 can determine a time (e.g., 1 p.m., and/or any other suitable time) at which the indication was received. In some embodiments, process 800 can cause an indication of the time point to be presented in connection with the presentation of the media content, as shown in and described above in connection with FIGS. 4A and 4B.

Process 800 can store information relating to the indicated time point in association with identifiers of one or more camera feeds that have recorded and/or are recording the media content at 820. For example, in some embodiments, process 800 can store an indication of the time point in association with an identifier of the camera feed currently being used to present the media content. Additionally or alternatively, in some embodiments, process 800 can store an indication of the time point in association with identifiers of any available camera feeds that are not currently being used to present the media content. In some embodiments, process 800 can cause indications of the time point to be presented in a user interface showing all bookmarked time points associated with the media content, for example, in response to determining that selectable input 214 of FIG. 2A has been selected.

Figure 9A:
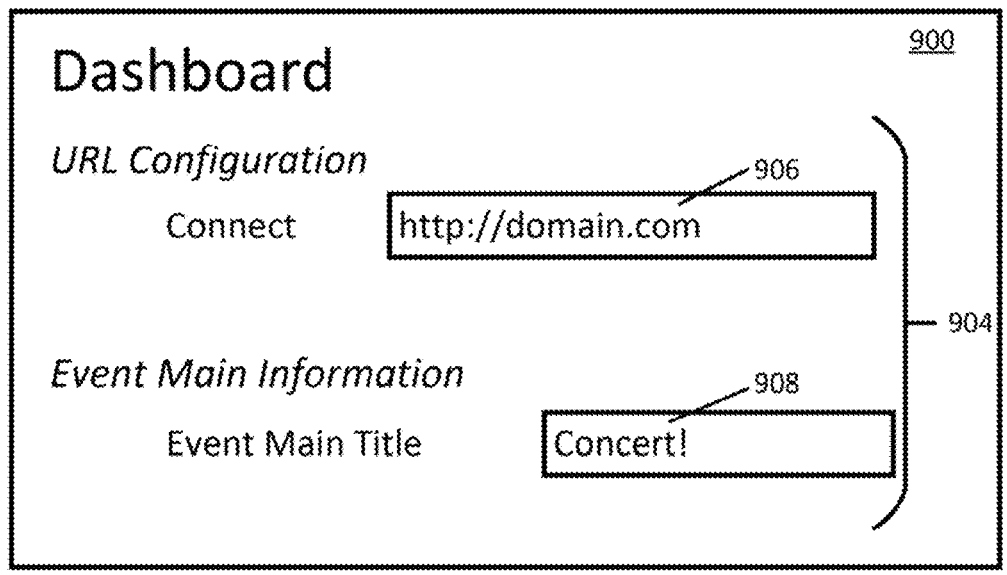
FIGS. 9A-9C show examples of user interfaces for configuring additional content related to a presentation of media content in accordance with some embodiments of the disclosed subject matter.
Figure 9B:
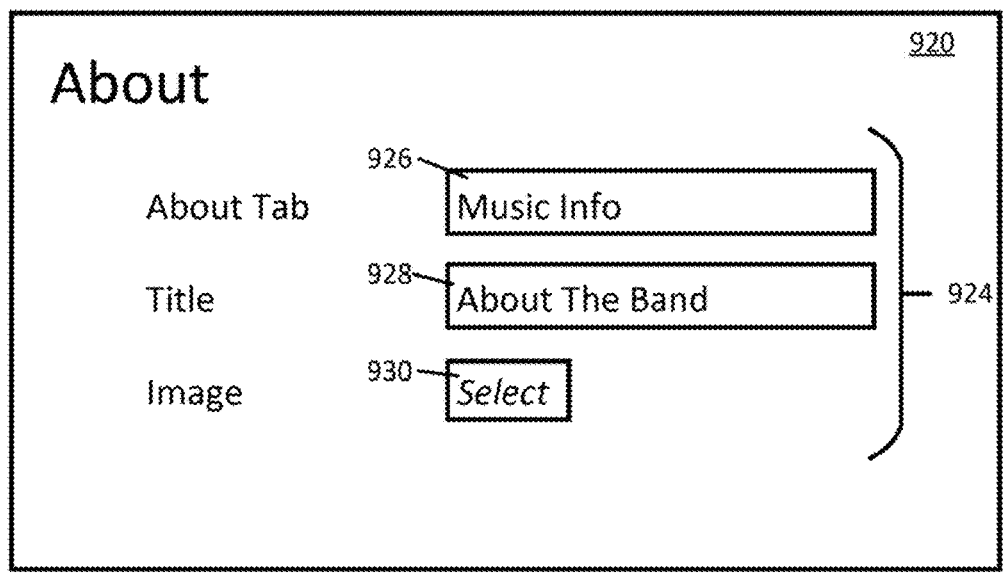
Figure 9C:
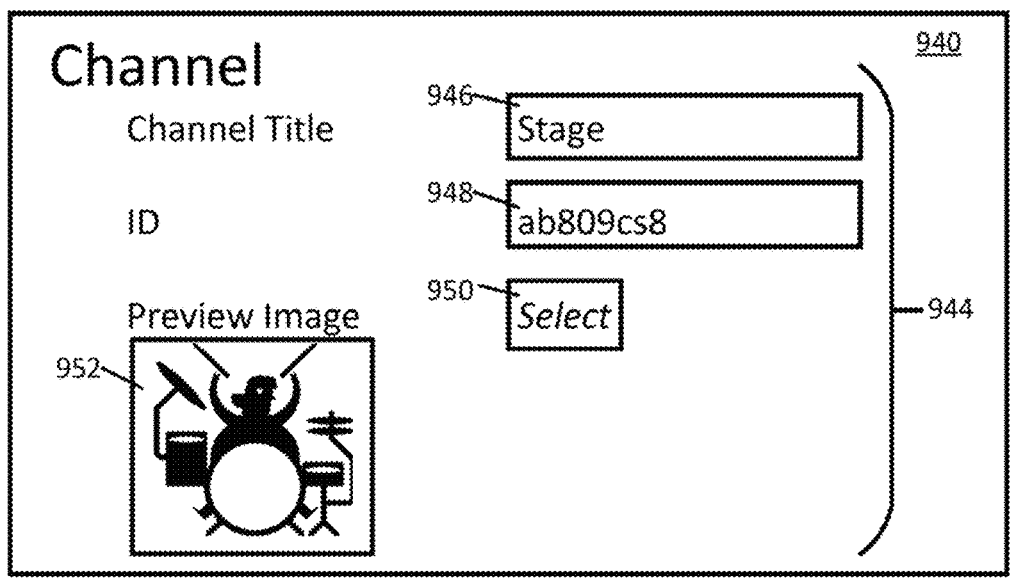

In some embodiments, identifiers of available camera feeds associated with the media content and/or identifiers of additional content related to the media content can be specified through one or more user interfaces, for example, by a producer and/or creator of the media content. In some such embodiments, server(s) 602 can cause the user interface(s) to be presented. Similarly, in some embodiments, server(s) 602 can store information received through the user interface(s), and can transmit the stored information to process 800. FIGS. 9A-9C show examples of user interfaces for receiving information associated with available camera feeds associated with the media content and/or additional content related to the media content.

FIG. 9A shows an example 900 of a user interface for specifying a URL and a title associated with media content in accordance with some embodiments of the disclosed subject matter. As illustrated, user interface 900 can include collection of inputs 904, which can include URL input 906 and/or event title input 908.

In some embodiments, URL input 906 can receive an indication of a URL at which the media content can be accessed. For example, in some embodiments, URL input 906 can indicate a particular web page of a video sharing site that can be used to access the media content.

In some embodiments, event title input 908 can receive an indication of a title of an event associated with the media content. For example, in some embodiments, event title 908 can correspond to title 202 of FIG. 2A.

Note that although only two inputs are shown in FIG. 9A, in some embodiments, any suitable number (e.g., one, three, five, ten, and/or any other suitable number) of inputs corresponding to any suitable information can be presented. For example, in some embodiments, FIG. 9A can include an input for specifying a password that is to be entered to allow access to the media content.

Turning to FIG. 9B, an example 920 of a user interface for specifying information about the media content is shown in accordance with some embodiments of the disclosed subject matter. As illustrated, user interface 920 can include collection of inputs 924, which can include tab input 926, content input 928, and/or image input 930.

Tab input 926 can receive an indication of a title for a user interface containing additional content related to the media content. For example, in some embodiments, tab input 926 can correspond to title 242 of FIG. 2C. In some embodiments, tab input 926 can receive any suitable content, such as images, graphics, icons, animations, and/or any other suitable input.

Content input 928 can receive additional content that is to be presented in a user interface. For example, in some embodiments, content input 928 can correspond to content 252 of FIG. 2C. In some embodiments, content input 928 can receive any suitable amount of content. Additionally, in some embodiments, content input 928 can receive any suitable content, such as images, graphics, icons, animations, videos, hyperlinks, and/or any other suitable content.

Image input 930 can receive an image that is to be presented in a user interface containing additional content related to the media content. For example, image input 930 can receive a selection of image 244 of FIG. 2C. In some embodiments, selection of image input 930 can cause a file selection user interface to be presented, for example, allowing a user to browse a directory to select a particular image file.

Note that, in some embodiments, any other suitable inputs can be included in user interface 920. For example, in some embodiments, inputs for receiving a name of an artist associated with the media content, a name of a song being presented, and/or any other suitable inputs can be included.

Turning to FIG. 9C, an example 940 of a user interface for specifying identifiers associated with available camera feeds corresponding to the media content is shown in accordance with some embodiments of the disclosed subject matter. As illustrated, user interface 940 can include collection of inputs 944, which can include channel title input 946, identifier input 948, and image input 950.

Channel title input 946 can receive an indication of a name corresponding to a particular camera feed. For example, the name can indicate a location of the camera(s) and/or a target of the camera(s). In some embodiments, channel title 946 can correspond to text associated with one of camera indicators 224-228 of FIG. 2B.

Identifier input 948 can receive an identifier corresponding to a particular camera feed. In some embodiments, identifier input 948 can receive a URL corresponding to the camera feed. Furthermore, in some embodiments, identifier input 948 can additionally include a selectable input that, when selected, causes a user interface that allows a user to browse for and select a camera feed and/or an identifier of a camera feed to be presented.

Image input 950 can receive a selection of an image that is to be used as a preview of the media content corresponding to the camera feed indicated by identifier input 948. In some embodiments, the image selected using image input 950 can be presented in user interface as image preview 952. In some embodiments, image input 950 and/or image preview 952 can be omitted.

Note that, in some embodiments, user interface 940 can include a map, on which a user of user interface 940 can indicate a location of a camera feed associated with identifier input 948. In some such embodiments, information received from user interface 940 can be used to create the camera map shown in and described above in connection with FIG. 2B.

In some embodiments, at least some of the above described blocks of the process of FIG. 8 can be executed or performed in any order or sequence not limited to the order and sequence shown in and described in connection with the figures. Also, some of the above blocks of FIG. 8 can be executed or performed substantially simultaneously where appropriate or in parallel to reduce latency and processing times. Additionally or alternatively, some of the above described blocks of the process of FIG. 8 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for providing media guidance are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for providing media guidance, the method comprising:
  causing live media content associated with a first content stream of a live event to be presented on a media playback device, wherein the first content stream corresponds with a first camera device that is capturing a first view of the live event;
  causing a verification code to be presented on the media playback device, wherein the verification code, when inputted into a user interface that is presented within a web browsing application executing on a mobile device, provides access to supplemental content relating to the media content being presented on the media playback device;
  detecting that the verification code has been inputted into the user interface within the web browsing application executing on the mobile device;
  in response to detecting that the verification code has been inputted into the user interface within the web browsing application executing on the mobile device, associating the mobile device with the media playback device;
  determining whether to present the supplemental content on the media playback device or the mobile device the;
  determining that the supplemental content is to be presented on the mobile device in response to determining that the supplemental content includes a user interaction portion that receives user input;
  in response to determining that the supplemental content is to be presented on the mobile device based on the user interaction portion of the supplemental content that receives user input, causing the supplemental content to be presented on the mobile device that includes (i) additional content relating to the media content that is presented on the media playback device and (ii) a map interface including a plurality of user interface elements that, when one of the plurality of user interface elements is selected via the map interface presented on the mobile device, causes live media content associated with a second content stream of the live event to be presented on the media playback device, wherein the second content stream corresponds with a second camera device that is capturing a second view of the live event from a position represented on the map interface, wherein the second view is from a different angle than the first view of the live event; and
  in response to determining that a user interface element from the plurality of user interface elements has been selected via the map interface, causing the presentation of the live media content associated with the first content stream of the live event to no longer be presented and causing the live media content associated with the second content stream of the live event to be presented.

2. The method of claim 1, wherein the user interface element is presented in the map interface representing a location of a camera associated with the second content stream of the live event.

3. The method of claim 1, wherein the additional content includes information about the live event associated with the live media content.

4. The method of claim 1, wherein the additional content includes an interactive poll associated with the live media content.

5. The method of claim 1, wherein the additional content includes one or more items related to the live media content that are available for purchase.

6. The method of claim 1, further comprising:
  receiving, from the mobile device, an indication that a time point associated with the live media content is to be bookmarked;
  storing a first indication of the time point in association with the first content stream; and
  storing a second indication of the time point in association with the second content stream.

7. The method of claim 6, further comprising:
  receiving, from the mobile device, an indication that the live media content is to be presented based on the time point from the first content stream; and
  presenting a suggestion that the live media content be viewed based on the time point from the second content stream.

8. The method of claim 1, wherein the mobile device is used to control playback of the presentation of the live media content on the media playback device.

9. The method of claim 1, wherein causing the additional content to be presented on the mobile device is in response to a determination that the additional content is to be presented on the mobile device based on a content type associated with the additional content.

10. A system for providing media guidance, the system comprising:
a hardware processor that is programmed to:
cause live media content associated with a first content stream of a live event to be presented on a media playback device, wherein the first content stream corresponds with a first camera device that is capturing a first view of the live event;
cause a verification code to be presented on the media playback device, wherein the verification code, when inputted into a user interface that is presented within a web browsing application executing on a mobile device, provides access to supplemental content relating to the media content being presented on the media playback device;
detect that the verification code has been inputted into the user interface within the web browsing application executing on the mobile device;
in response to detecting that the verification code has been inputted into the user interface within the web browsing application executing on the mobile device, associate the mobile device with the media playback device;
determine whether to present the supplemental content on the media playback device or the mobile device the;
determine that the supplemental content is to be presented on the mobile device in response to determining that the supplemental content includes a user interaction portion that receives user input;
in response to determining that the supplemental content is to be presented on the mobile device based on the user interaction portion of the supplemental content that receives user input, cause the supplemental content to be presented on the mobile device that includes (i) additional content relating to the media content that is presented on the media playback device and (ii) a map interface including a plurality of user interface elements that, when one of the plurality of user interface elements is selected via the map interface presented on the mobile device, causes live media content associated with a second content stream of the live event to be presented on the media playback device, wherein the second content stream corresponds with a second camera device that is capturing a second view of the live event from a position represented on the map interface, wherein the second view is from a different angle than the first view of the live event; and
in response to determining that a user interface element from the plurality of user interface elements has been selected via the map interface, causing the presentation of the live media content associated with the first content stream of the live event to no longer be presented and causing the live media content associated with the second content stream of the live event to be presented.

11. The system of claim 10, wherein the user interface element is presented in the map interface representing a location of a camera associated with the second content stream of the live event.

12. The system of claim 10, wherein the additional content includes information about the live event associated with the live media content.

13. The system of claim 10, wherein the additional content includes an interactive poll associated with the live media content.

14. The system of claim 10, wherein the additional content includes one or more items related to the live media content that are available for purchase.

15. The system of claim 10, wherein the hardware processor is further programmed to:
receive, from the mobile device, an indication that a time point associated with the live media content is to be bookmarked;
store a first indication of the time point in association with the first content stream; and
store a second indication of the time point in association with the second content stream.

16. The system of claim 15, wherein the hardware processor is further programmed to:
receive, from the mobile device, an indication that the live media content is to be presented based on the time point from the first content stream; and
present a suggestion that the live media content be viewed based on the time point from the second content stream.

17. The system of claim 10, wherein the mobile device is used to control playback of the presentation of the live media content on the media playback device.

18. The system of claim 10, wherein causing the additional content to be presented on the mobile device is in response to a determination that the additional content is to be presented on the mobile device based on a content type associated with the additional content.

19. A non-transitory computer-readable medium containing computer executable instructions that, when executed by a processor, cause the processor to perform a method for providing media guidance, the method comprising:
causing live media content associated with a first content stream of a live event to be presented on a media playback device, wherein the first content stream corresponds with a first camera device that is capturing a first view of the live event;
causing a verification code to be presented on the media playback device, wherein the verification code, when inputted into a user interface that is presented within a web browsing application executing on a mobile device, provides access to supplemental content relating to the media content being presented on the media playback device;
detecting that the verification code has been inputted into the user interface within the web browsing application executing on the mobile device;
in response to detecting that the verification code has been inputted into the user interface within the web browsing application executing on the mobile device, associating the mobile device with the media playback device;
determining whether to present the supplemental content on the media playback device or the mobile device the;
determining that the supplemental content is to be presented on the mobile device in response to determining that the supplemental content includes a user interaction portion that receives user input;

in response to determining that the supplemental content is to be presented on the mobile device based on the user interaction portion of the supplemental content that receives user input, causing the supplemental content to be presented on the mobile device that includes (i) additional content relating to the media content that is presented on the media playback device and (ii) a map interface including a plurality of user interface elements that, when one of the plurality of user interface elements is selected via the map interface presented on the mobile device, causes live media content associated with a second content stream of the live event to be presented on the media playback device, wherein the second content stream corresponds with a second camera device that is capturing a second view of the live event from a position represented on the map interface, wherein the second view is from a different angle than the first view of the live event; and in response to determining that a user interface element from the plurality of user interface elements has been selected via the map interface, causing the presentation of the live media content associated with the first content stream of the live event to no longer be presented and causing the live media content associated with the second content stream of the live event to be presented.

20. The non-transitory computer-readable medium of claim 19, wherein the user interface element is presented in the map interface representing a location of a camera associated with the second content stream of the live event.

21. The non-transitory computer-readable medium of claim 19, wherein the additional content includes information about the live event associated with the live media content.

22. The non-transitory computer-readable medium of claim 19, wherein the additional content includes an interactive poll associated with the live media content.

23. The non-transitory computer-readable medium of claim 19, wherein the additional content includes one or more items related to the live media content that are available for purchase.

24. The non-transitory computer-readable medium of claim 19, wherein the method further comprises:
receiving, from the mobile device, an indication that a time point associated with the live media content is to be bookmarked;
storing a first indication of the time point in association with the first content stream; and
storing a second indication of the time point in association with the second content stream.

25. The non-transitory computer-readable medium of claim 24, wherein the method further comprises:
receiving, from the mobile device, an indication that the live media content is to be presented based on the time point from the first content stream; and
presenting a suggestion that the live media content be viewed based on the time point from the second content stream.

26. The non-transitory computer-readable medium of claim 19, wherein the mobile device is used to control playback of the presentation of the live media content on the media playback device.

27. The non-transitory computer-readable medium of claim 19, wherein causing the additional content to be presented on the mobile device is in response to a determination that the additional content is to be presented on the mobile device based on a content type associated with the additional content.

* * * * *